United States Patent [19]
Rinker et al.

[11] 3,939,873
[45] Feb. 24, 1976

[54] CORROSION RESISTANT GLASS-REINFORCED PLASTIC PIPE LINER
[75] Inventors: James W. Rinker, Orwigsburg, Pa.; William M. Jacobs, Severna Park, Md.
[73] Assignee: Exxon Research and Engineering Company, Linden, N.J.
[22] Filed: June 7, 1974
[21] Appl. No.: 477,254

Related U.S. Application Data
[62] Division of Ser. No. 391,866, Aug. 27, 1973.

[52] U.S. Cl. .......... 138/144; 138/153; 138/DIG. 2; 138/DIG. 7
[51] Int. Cl.² .......................................... F16L 9/16
[58] Field of Search ..... 161/159; 156/244; 138/141, 138/153, 144, DIG. 2, DIG. 7

[56] References Cited
UNITED STATES PATENTS

| | | |
|---|---|---|
| 2,815,043 | 12/1957 | Kleiner et al. ................. 138/DIG. 7 |
| 2,945,638 | 7/1960 | Crawford et al. ............... 138/141 X |
| 3,054,428 | 9/1962 | Crawford ........................... 138/141 |
| 3,347,727 | 10/1967 | Bobkowicz et al. ................ 156/244 |
| 3,567,545 | 3/1971 | Bobkowicz et al. ................ 156/244 |
| 3,716,437 | 2/1973 | Newman et al. .................... 156/244 |

Primary Examiner—Richard C. Queisser
Assistant Examiner—Charles Gorenstein

[57] ABSTRACT

An inner liner for glass-reinforced plastic pipes comprising a nonwoven fabric bonded to each side of a plastic film. In the manufacture of pipe, the composition is saturated with the plastic resin, e.g., polyester resin, and wound onto the pipe mandrel. The resin-glass body of the pipe is then wound over the liner and the entire composition cured.

The liner prevents damage to the pipe as a result of corrosive material, e.g., mineral acids.

9 Claims, 3 Drawing Figures

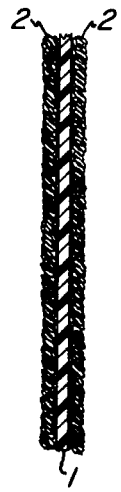
FIG. I
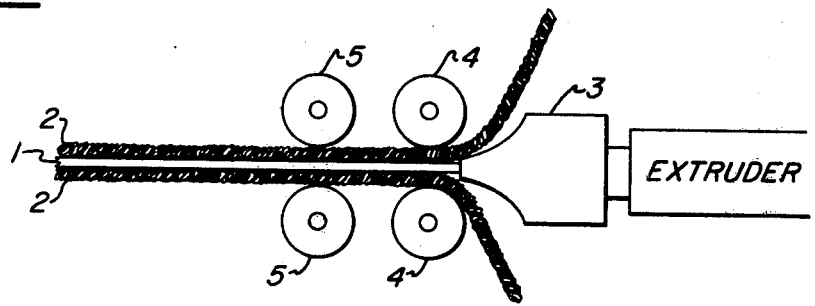
FIG. II
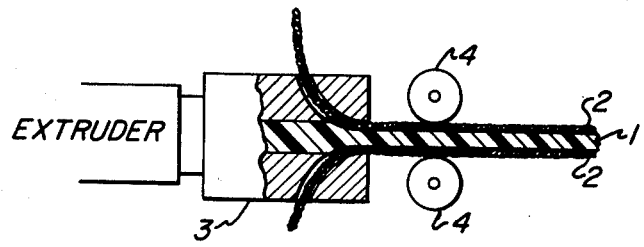
FIG. III

CORROSION RESISTANT GLASS-REINFORCED PLASTIC PIPE LINER

This is a division, of Ser. No. 391,866 filed Aug. 27, 1973.

BACKGROUND OF THE INVENTION

Glass-reinforced plastic pipe is generally prepared by spirally winding a glass fabric which has been resin-impregnated around a mandrel and thereafter curing the resin prior to removing the mandrel. Suitable resins for such pipe are polyester resins, epoxy resins, etc.

Though such pipe of commerce has distinct advantages over concrete or iron pipe, it suffers of an inherent weakness, to wit: areas of the glass fabric may not be completely saturated with resin. Thus, the glass is subject to attack by corrosive material by wicking of the corrosive materials, e.g., alkali, acids, etc., into the glass backing at points where the backing is not fully coated with resin.

Attempts have been made to alleviate this problem by lining the pipe with an inert material, e.g., polyolefin film. These attempts have met with marginal success since the polyolefins do not themselves bond to the resin used to manufacture the pipe.

SUMMARY OF THE INVENTION

It has surprisingly been found that an effective barrier to corrosive materials for glass-reinforced plastic (GRP) pipe may be prepared by using as a liner in the manufacture of GRP pipe a composition comprising a central core of polyolefin sandwiched between two porous members which have been thermally bonded to the polyolefin core.

Suitable polyolefins are polyethylene and polypropylene while suitable porous members are nonwoven fabrics of polyolefins, open celled sponges of urethanes, etc.

The GRP pipe is produced by saturating the liner with the plastic resin used to manufacture the pipe, winding the saturated liner about a mandrel and thereafter winding resin impregnated glass fabric over the liner. The mass is then cured and the mandrel removed.

BRIEF DESCRIPTION OF THE DRAWINGS

FIG. 1 illustrates the liner of this invention comprising an inner plastic core sandwiched between two porous members.

FIG. 2 shows a method of preparing the pipe liner.

FIG. 3 shows a die configuration suitable for use in the manufacture of the liner.

DETAILED DESCRIPTION

The glass-reinforced plastic (GRP) pipe liner of this invention comprises a core of polymeric film which is impervious to corrosive materials such as alkalis and acids sandwiched between two similarly resistant porous layers.

The polymeric film core may be prepared from polyolefins such as polyethylene or polypropylene. Any thermoplastic substance which is sufficiently flexible to be wrapped around a mandrel and is impervious to liquids, especially corrosive materials such as acid and alkalis may be used. The liner is constructed in a sandwich fashion wherein the outer layers of the sandwich are porous members.

Although the preferred porous members are nonwoven fabrics such as a nonwoven polyethylene, nonwoven polypropylene, or nonwoven polyethylene terphthalate fabric, any porous membrane may be used. It is not essential that the porous material form a bond with any resin used in making the GRP pipe. It is sufficient if the porous material is sufficiently porous to absorb a quantity of resin thereby producing a good mechanical entanglement.

The liner material may be prepared in several ways. It is essential, however, that the outer porous members be thermally bonded to the inner core. The term "thermally bonded" as used in the specification and claims means a mechanical bonding by heat plasticizing the inner core material and imbedding of the outer porous member into the inner core.

In a preferred embodiment, the pipe liner is prepared by feeding two webs of porous material into the nip of rolls into which is extruded core material. FIG. 1 illustrates a typical liner. The core 1 may be any flexible thermoplastic material such as polyethylene, polypropylene, etc., or elastomers such as butyl rubber, natural rubber, styrene butadiene rubber, etc. Similarly the porous outer members 2 may be any porous material. The preferred porous materials are nonwoven polyolefins or polyesters such as polyethylene, polypropylene, or polyethylene terphthalate or nonwoven glass matting. Illustrative of the glass matting is a product known as "E-glass".

It will be obvious to those skilled in the art that the preferred porous elements are fibrous in nature whether they be nonwoven or woven fabric. Included in this fibrous porous element is fibrous steel mat commonly known as steel wool.

It is possible, of course, to use any sponge material such as polyurethane sponge or cellulose sponge. The only requirement of the porous material is that it be sufficiently porous to absorb the resin used in preparing the GRP pipe and be capable of thermal bonding to the core material. Where sponges are used, an open celled sponge structure is preferred.

FIG. 2 illustrates a method of preparing the liner. A core material 1 is extruded through a die head 3 located at the end of an extruder. The core material is extruded into the nip of compression rolls 4. Webs of porous material 2 are fed into the compression roll nip onto either side of the core material 1. The mass is compressed in the compression rolls and thereafter cooled by cooling rolls 5. In another embodiment of this invention, the compression rolls may act as the cooling rolls.

An alternate method of manufacture is to pass the porous outer layers directly into the die and out of the die nip as illustrated in FIG. III. The thermoplastic material 1 is extruded through the die between the two porous layers 2. The composition so formed is then passed through chill rolls 4 to cool it. By this method of manufacture, a mechanical bond between the thermoplastic core and the porous outer member is formed.

The core film thickness is not critical. Its thickness will be determined by the type of thermoplastic material selected, the strength of said thermoplastic material and its flexibility. Generally a thickness of about 5–40 mils is acceptable; preferably the core film is about 10–30 mils, more preferably about 10–20 mils, most preferably 15 mils. The thickness of the porous outer members is not critical.

In preparing the pipe liner it is essential that the porous members be mechanically imbedded into the core film. Ahdesive bonding has been found to be inadequate; hence the requirement for a thermoplastic core into which the porous member will imbed. Illustrative of the porous material which may be used in the practice of this invention is duPont spunbonded nonwoven polyethylene terphthalate sold under the trademark "Reemay". A typical liner composition comprises two layers of Reemay between which is sandwiched a polyethylene film of about 10 mils, the product being manufactured by passing layers of Reemay into the nip of compressor rolls. Using a 60-inch extrusion die attached to a 4½-inch extruder, polyethylene is extruded through the nip simultaneous with drawing of the Reemay through the nip. The composite is thereafter passed through chill rolls. The composite sheet is then slit into 7-inch wide sections. The 7-inch wide liner elements are saturated with polyester resin. These saturated strips are spirally wound about a pipe mandrel.

Glass cloth which has been similarly saturated is then wound onto the same mandrel over the liner. This laminate of resin impregnated liner and resin impregnated glass cloth is cured by heating in an oven, then cooled and the mandrel removed. The resulting paper is lighter in weight than conventional pipe and has the added advantage that it is resistant to attack by corrosive materials. Conventional pipe may be damaged by wicking of corrosive materials through the glass reinforcing.

Although the preferred use of the product of this invention is as a liner for reinforced pipe, it is obvious to those skilled in the art that the "liner" may be the sole reinforcing element. Of course, a multiplicity of such liner elements may be used as the reinforcing means. In its preferred embodiment, at least two layers of liner element are used. In the event no reinforcing element other than the liner element of this invention is used, it is preferred that the porous element of the liner be nonwoven glass mat.

It has been found that the liner must have porous members on both sides of the core. Attempts to use a liner made up of a core barrier and one porous member have failed. In the manufacture of pipe, the liner is spirally wound over the mandrel in an overlapping fashion. The overlapping is necessary in order to form a continuous liner surface, where the liner comprises only one porous member and the core barrier, overlapping results in resin impregnated porous members coming into contact with the core member to which the resin will not bond. Conversely, bonding occurs with the sandwich construction when porous element contacts porous element, both of which have been resin impregnated.

What is claimed is:

1. A reinforced plastic pipe wherein said reinforced pipe is made by impregnating the reinforcing material with a curable plastic resin and curing said reinforcing material-resin composite which comprises:
   a. an innerliner of a composition comprising a central barrier core of flexible thermoplastic material sandwiched between two porous members, said liner being impregnated with a curable plastic resin; and
   b. an overlayer of resin impregnated glass reinforcing material selected from the group consisting of glass mat, glass fabric and mixtures thereof.

2. The plastic pipe of claim 1 wherein
   a. the core material material is polyethylene or polypropylene having a thickness of about 10 to about 30 mils;
   b. the porous fibrous material is nonwoven polyethylene, nonwoven polypropylene, nonwoven polyethylene terphthalate or nonwoven glass mat; and
   c. the resin is a polyester resin or epoxy resin.

3. A reinforced plastic pipe wherein said pipe comprises at least one layer of a reinforcing element impregnated with a curable resin selected from the group consisting of polyester resin and epoxy resins, the reinforcing element-curable resin composition being exposed to curing conditions, thereby bringing the resin to a fully cured state wherein said reinforcing element comprises a central core of a thermoplastic flexible polymeric material sandwiched between two layers of a porous element, said porous element being thermally bonded to said core.

4. The composition of claim 3 wherein said pipe comprises a multiplicity of reinforcing elements.

5. The composition of claim 4 wherein the pipe comprises two layers of reinforcing element.

6. The reinforced plastic pipe of claim 3 wherein the core material is polyethylene or polypropylene, the porous element comprises nonwoven polyethylene, nonwoven polypropylene, nonwoven polyethylene terphthalate, nonwoven glass mat or steel wool and the plastic resin is polyester or epoxy resin.

7. The composition of claim 3 wherein the porous material is a fibrous porous material, cellulose sponge or polyurethane sponge.

8. A composite reinforced plastic pipe which comprises:
   a. an innerliner of a composition comprising a central barrier core of elastomeric material selected from the group consisting of butyl rubber, natural rubber, and styrene butadiene rubber sandwiched between two porous members, said liner being impregnated with a curable plastic resin; and
   b. an overlayer of resin impregnated glass reinforcing material selected from the group consisting of glass mat, glass fabric and mixtures thereof.

9. The plastic pipe of claim 8 wherein the porous members are selected from the group consisting of nonwoven polyethylene, nonwoven polypropylene, nonwoven polyethylene terphthalate or nonwoven glass mat and the curable plastic resin is a polyester resin or epoxy resin.

* * * * *